US011275351B2

(12) United States Patent
Holmstrom

(10) Patent No.: US 11,275,351 B2
(45) Date of Patent: Mar. 15, 2022

(54) PROCESS MONITORING AND ADAPTIVE CONTROL OF A MACHINE TOOL

(71) Applicant: SANDVIK INTELLECTUAL PROPERTY AB, Sandviken (SE)

(72) Inventor: Tennerth Holmstrom, Bastad (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 112 days.

(21) Appl. No.: 15/768,003

(22) PCT Filed: Sep. 27, 2016

(86) PCT No.: PCT/EP2016/072954
§ 371 (c)(1),
(2) Date: Apr. 12, 2018

(87) PCT Pub. No.: WO2017/063868
PCT Pub. Date: Apr. 20, 2017

(65) Prior Publication Data
US 2018/0299865 A1 Oct. 18, 2018

(30) Foreign Application Priority Data

Oct. 13, 2015 (EP) ..................................... 15189543

(51) Int. Cl.
*G05B 19/4065* (2006.01)
*G05B 19/414* (2006.01)
(52) U.S. Cl.
CPC ....... *G05B 19/4065* (2013.01); *G05B 19/414* (2013.01); *G05B 2219/34273* (2013.01);
(Continued)

(58) Field of Classification Search
CPC .............. G05B 19/4065; G05B 19/414; G05B 2219/37077; G05B 2219/36056;
(Continued)

(56) References Cited

U.S. PATENT DOCUMENTS 4,992,712 A 2/1991 Fujimoto et al.
5,127,090 A * 6/1992 Ruehle ................. G05B 19/052
709/246
(Continued)

FOREIGN PATENT DOCUMENTS

CN 101468415 A 7/2009
CN 103823409 A 5/2014
(Continued)

*Primary Examiner* — Jigneshkumar C Patel
(74) *Attorney, Agent, or Firm* — Corinne R. Gorski

(57) ABSTRACT

A control system includes a programmable logic control section controlling operation of a machine and a numerical control section controlling relative motion between a tool of the machine and a work piece. A method, performed in the control system, includes: evaluating an input signal, received by the programmable logic control section, in relation to a first condition, wherein the input signal includes information about a state of the tool or of a subtractive process performed via interaction of the tool and the work piece; and in response to the input signal satisfying the first condition, providing the information to the numerical control section. The state may for example be tool breakage, tool wear or wrong cutting data. An operator of the machine may for example specify via programs in the numerical control section how the machine is to respond to such states.

15 Claims, 3 Drawing Sheets

(52) U.S. Cl.
CPC .............. *G05B 2219/34288* (2013.01); *G05B 2219/35263* (2013.01); *G05B 2219/36056* (2013.01); *G05B 2219/37077* (2013.01)

(58) Field of Classification Search
CPC ........... G05B 2219/34288; G05B 2219/35263; G05B 2219/34273
USPC ........................................................ 700/192
See application file for complete search history.

(56) References Cited

U.S. PATENT DOCUMENTS

| | | | | |
|---|---|---|---|---|
| 2003/0163286 | A1* | 8/2003 | Yasugi | ............... G05B 19/4065 |
| | | | | 702/185 |
| 2010/0324720 | A1 | 12/2010 | Zhan et al. | |
| 2011/0113939 | A1* | 5/2011 | Simon | .................... B27G 19/02 |
| | | | | 83/13 |
| 2014/0216170 | A1* | 8/2014 | Ma | ..................... B23Q 17/0966 |
| | | | | 73/862.06 |

FOREIGN PATENT DOCUMENTS

| | | | |
|---|---|---|---|
| EP | 1034880 | A1 | 9/2000 |
| EP | 1231527 | A2 | 8/2002 |
| JP | H06335841 | A * | 2/1992 |

* cited by examiner

PROCESS MONITORING AND ADAPTIVE CONTROL OF A MACHINE TOOL

RELATED APPLICATION DATA

This application is a § 371 National Stage Application of PCT International Application No. PCT/EP2016/072954 filed Sep. 27, 2016 claiming priority to EP Application No. 15189543.0 filed Oct. 13, 2015.

TECHNICAL FIELD

The present disclosure generally relates to monitoring and adaptive control of processes in numerically controlled machine tools.

BACKGROUND

Programmable logic controllers (PLCs) are used for automation of many different types of machines. A machine controlled by a PLC may provide input signals to the PLC while the PLC provides control signals to the machine based on these input signals. Although PLCs may be employed for a wide range of tasks, motion of machine tools (such as machine tools for metal cutting) is often automated via use of numerical control (NC) or computer numerical control (CNC). Motion of the machine tool may for example be controlled along multiple axes via executable programs or commands entered by an operator. Commands may for example be entered directly via a dedicated user interface at a machine, or via a computer connected to the machine. Executable programs may for example be provided to the machine via a computer connected to the machine.

A machine may be monitored during operation and may be adaptively controlled to improve performance. In case an undesired state or event is detected during operation, control signals may be provided to the machine for the machine to respond appropriately. If for example a tool breakage is detected, an alarm may be triggered to the operator of the machine, and a subtractive process performed via interaction of the tool and a work piece may be discontinued by automatically retracting the tool from the work piece. Monitoring operation of a machine and providing appropriate responses to detected events or states may prevent damage to the machine, to a tool of the machine and/or to a work piece, may extend the lifetime of the machine and/or a tool of the machine, may reduce manufacturing times, and/or may improve the quality of manufactured products.

SUMMARY

It would be advantageous to prevent damage to a machine, to a tool of the machine and/or to a work piece, extend the lifetime of the machine and/or a tool of the machine, reduce manufacturing times, and/or improve the quality of manufactured products. To better address one or more of these issues, methods and control systems having the features defined in the independent claims are provided. Associated computer programs, computer program packages, computer-readable storage means, and systems are also provided. Preferable embodiments are defined in the dependent claims.

Hence, according to a first aspect, a method is provided. The method is performed in a control system. The control system comprises a programmable logic control section configured to control operation of a machine. The control system also comprises a numerical control section configured to control relative motion between a tool of the machine and a work piece. The method comprises evaluating an input signal, received by the programmable logic control section, in relation to a first condition. The input signal includes information about a state of the tool or about a state of a subtractive process performed via interaction of the tool and the work piece. The method comprises providing the information to the numerical control section in response to the input signal satisfying the first condition.

The state of the tool or the subtractive process may indicate that the machine is not operated in an optimal way, and that operation of the machine may therefore preferably be modified. How to best respond to a particular state of the tool or the subtractive process may be different depending on the circumstances, and may not have been known when the machine was manufactured or installed. Properties of the machine and/or the tool may for example change over time in a way which may not have been predicted by the machine manufacturer, or the machine may be operated with a new type of tool. The most appropriate response to a given state may also depend on the geometry or material of the object currently being manufactured. It may therefore be advantageous to allow an operator of the machine to specify how the machine is to respond to certain states of the tool or the subtractive process.

In many machines, responses to a number or predefined states (e.g. critical events such as tool breakage) are controlled by a programmable logic controller (PLC). The machine manufacturer typically includes instructions (or commands or programs) in the PLC for how to respond to these states. Such instructions may for example include immediate stop of spindle rotation, signaling of an alarm and numerical control reader inhibit for preventing further motion of the tool. Programs or instructions in a PLC may be difficult or even impossible for an operator of the machine to edit, while programs in the numerical control section may be easily editable by the operator, for example via a user interface arranged at the machine. Providing the information about the state of the tool or the subtractive process to the numerical control section (in response to the input signal satisfying the first condition) allows a program in the numerical control section to provide a response to the state. Such a program in the numerical control section may for example be edited by the operator to provide a customized response based on the current circumstances and/or based on a preference of the operator. Providing the information about the state of the tool or the subtractive process to the numerical control section (in response to the input signal satisfying the first condition) therefore allows for improving operation of the machine, which may prevent damage to the machine, to the tool and/or to the work piece, and/or which may lead to reduced manufacturing times, improved quality of manufactured products, and/or extended lifetime of the machine and/or the tool.

The input signal (received by the programmable logic control section) may include information about a state of the tool, a state of the subtractive process performed via interaction of the tool and the work piece, or states of both the tool and the subtractive process.

The state of the tool may for example be tool breakage, tool wear or tool missing. Tool wear may indicate that the tool is worn and should be replaced (or should be operated at a different spindle speed, depth or feed rate until being replaced).

The state of the tool may for example be a temperature or force to which the tool is subjected, or a vibration of the tool.

The state of the tool may for example be that a temperature, force or vibration of the tool exceeds a threshold or is within a specific range.

The state of the subtractive process may for example include cutting data such as spindle speed, cutting depth and/or feed rate, or may include other parameters related to the interaction between the tool and the work piece.

The state of the subtractive process may for example be wrong cutting data. Wrong cutting data may indicate that currently employed cutting data such as spindle speed, cutting depth and/or feed rate is unsuitable for the tool. The currently employed cutting data may for example not comply with recommended cutting data specified by a tool manufacturer.

The state of the subtractive process may for example relate to process chatter, i.e. machining vibrations of the tool and/or work piece.

The state of the subtractive process may for example be that the work piece is missing and that there is in fact no interaction between the tool and the work piece.

The state of the subtractive process may for example relate to the result of the interaction of the tool and the work piece, such as the current geometry or surface finish of the work piece.

The state of the subtractive process may for example be that a current geometry of the work piece is within a tolerance (i.e. that the achieved geometry of the work piece is acceptable), and that the subtractive process may therefore be discontinued.

The information may for example be provided in the form of a number of bits which may indicate a state of the tool or the subtractive process.

The information may for example be provided (in response to the input signal satisfying the first condition) as input to a computer program being executed by the numerical control section, or as input to a computer program assigned to be executed by the numerical control section.

The information may for example be provided (or forwarded) to the numerical control section in the same format as it was received by the programmable logic control section, or in a different (transformed) format.

The information may for example be provided to the numerical control section by assigning one or more values of one or more internal variables of the numerical control section.

In some embodiments, the whole input signal may be provided (or forwarded) to the numerical control section, while in other embodiments, only part of the input signal may be forwarded to the numerical control section.

The programmable logic control section may for example be a digital computer for logic control of the machine.

The programmable logic control section may for example be a software part (or portion) of the control system for logic control of the machine.

The programmable logic control section may for example be a programmable logic controller (PLC) or a programmable logic relay (PRL).

The numerical control section may for example be configured to control motion of the tool and/or work piece along one or more axes.

The numerical control section may for example be arranged to control one or more servos for providing translation and/or rotation of the tool and/or the work piece.

The numerical control section may for example be a numerical control kernel (NCK).

The numerical control section may for example perform computerized numerical control (CNC).

The numerical control section may for example be a software part (or portion) of the control system.

The tool may for example be arranged for subtractive manufacturing, such as cutting, drilling, milling, turning, reaming, threading or grinding.

The work piece may for example be an object with which the tool is arranged to interact.

The work piece may for example comprise metal, wood, polymer material, or a composite material.

The method may for example be performed in the programmable logic control section (which may for example be a PLC).

The programmable logic control section and the numerical control section may for example be two separate (or physically distinguishable) devices, circuits or units.

The programmable logic control section and the numerical control section may for example be two logically separate (or logically distinguishable) parts or portions of the control system.

According to some embodiments, the information included in the input signal may indicate tool breakage, tool wear, tool missing, work piece missing, wrong cutting data, a temperature to which the tool is subjected, a force to which the tool is subjected, tool vibration, process chatter (i.e. machining vibrations of the tool and/or work piece), or a current geometry of the work piece.

It will be appreciated that an indication of a temperature to which the tool is subjected may for example be a specific temperature value, a temperature range, or an indication that the temperature exceeds a threshold.

It will be appreciated that an indication of a force to which the tool is subjected may for example be a specific force magnitude, a force magnitude interval, or an indication that the magnitude of the force exceeds a threshold.

It will be appreciated that an indication of tool vibration (or process chatter) may for example be a specific value, a range, or an indication that the magnitude of the vibration (or chatter) exceeds a threshold.

It will be appreciated that an indication of a current geometry of the work piece may for example include an indication of a specific geometry currently obtained or an indication that a currently obtained geometry of the work piece is within a tolerance (i.e. that the achieved geometry of the work piece is acceptable), and that the subtractive process may therefore be discontinued.

Tool wear may indicate that the tool is worn and should be replaced (or should be operated at a different spindle speed, depth or feed rate until being replaced).

Wrong cutting data may indicate that currently employed cutting data such as spindle speed, cutting depth and/or feed rate is unsuitable for the tool. The currently employed cutting data may for example not comply with recommended cutting data specified by a tool manufacturer.

According to some embodiments, the method may further comprise evaluating the input signal in relation to a second condition. The method may further comprise, in response to the input signal satisfying the second condition: triggering interruption of a computer program executed by the numerical control section, assigning a computer program in the numerical control section to be the executed by the control system, and providing the information as input to the assigned computer program.

For some states of the tool or of the subtractive process (such as tool breakage), a quick response by the control system may be preferable. Triggering interruption of a computer program executed by the numerical control section, and assigning a computer program in the numerical control section to be executed allows for a quick response to the state indicated by the input signal.

As described above, computer programs in the numerical control section may be more easily editable by an operator of the machine than instructions (or commands or programs) in a PLC. The assigned program in the numerical control section may for example be a customized program provided by an operator of the machine for causing the control system to provide an appropriate response to the state indicated by the input signal.

Providing the information as input to the assigned program may allow the assigned program (e.g. a customized program provided by an operator of the machine) to distinguish between different states, and to decide how to respond, rather than such a distinction being made in a program stored in (or executed by) other parts of the control section, such as in the programmable logic control section. In this way, more control is placed in the more easily editable numerical control section, which facilitates provision of a more adequate response to the state indicated by the input signal.

The assigned computer program may for example be a numerical control program including a number of commands or instructions, rather than only including a single command or instruction (such as "move the tool a distance D along axis X").

The assigned computer program may for example include subprograms associated with respective states of the tool or of the subtractive process. The assigned computer program may for example employ the information received as input to select one or more subprograms to be executed, so as to provide a response appropriate for the particular state indicated by the input signal.

The interruption may for example be triggered via a physically implemented interrupt functionality of the control section (such as a dedicated interrupt port), or via a software-implemented interrupt functionality.

The interruption may for example cause an already initiated motion of the tool and/or the work piece to be discontinued before being completed, so that the assigned program may be executed as soon as possible. Alternatively, an initiated motion may be allowed to be completed before the assigned program is executed.

The assigned computer program may for example be stored in the numerical control section.

The assigned computer program may for example be assigned to be executed by the numerical control section.

According to some embodiments, the method may comprise, in response to the information included in the input signal indicating a state from a set of predefined states: triggering interruption of a computer program executed by the numerical control section, assigning a computer program in the numerical control section to be the executed by the control system, and providing the information as input to the assigned computer program. The set of predefined states may include tool breakage, tool wear, tool missing, work piece missing, wrong cutting data, a temperature to which the tool is subjected exceeds a threshold, a force to which the tool is subjected exceeds a threshold, tool vibration exceeds at threshold, process chatter exceeds a threshold, or a geometry of the work piece is within a tolerance.

It will be appreciated that the set of predefined states may for example include one or more (or all) of the following states: tool breakage, tool wear, tool missing, work piece missing, wrong cutting data, a temperature to which the tool is subjected exceeds a threshold, a force to which the tool is subjected exceeds a threshold, tool vibration exceeds at threshold, process chatter exceeds a threshold, and a current geometry of the work piece is within a tolerance.

The states in the set of predefined states may for example require quick response by the control system. The type of action provided in response to these states may for example be customized by the operator of the machine via the assigned computer program in the numerical control section.

According to some embodiments, the assigned computer program in the numerical control section may include instructions for controlling the machine to discontinue a motion (e.g. a rotation or a translation of the tool and/or the work piece), retract the tool (or a cutting edge of the tool) from the work piece, retract the work piece from the tool (or from a cutting edge of the tool), replace the tool by a sister tool, move the tool towards a camera for evaluation, move the work piece towards a camera for evaluation, trigger motion of a camera for evaluation of the tool, trigger motion of a camera for evaluation of the work piece, or change cutting data.

It will be appreciated that the assigned computer program in the numerical control section may for example include instructions for controlling the machine to perform one or more (or all) of the following actions:
discontinue a motion, retract the tool from the work piece, retract the work piece from the tool, replace the tool by a sister tool, move the tool towards a camera for evaluation, move the work piece towards a camera for evaluation, trigger motion of a camera for evaluation of the tool, trigger motion of a camera for evaluation of the work piece, and change cutting data.

Optical evaluation using a camera may for example be employed for determining whether the tool needs to be replaced or for determining whether a geometry of the work piece is within a tolerance.

Motion of the camera (for evaluating the tool or the work piece) may for example be provided via use of a robot.

The assigned program may for example include subprograms (or subroutines) for handling the respective predefined states. The appropriate subprogram may for example be selected based on the information provided as input to the assigned program.

In case the state indicated by the input signal is tool breakage, tool wear, or tool missing, the assigned program may for example cause the machine to discontinue one or more motions of the tool, retract the tool (or a cutting edge of the tool) from the work piece, and then replace the tool by a sister tool.

In case the state indicated by the input signal is work piece missing, the assigned program may for example cause the machine to pause and to notify the operator, and may then trigger a robot to move a new work piece into position for subtractive manufacturing.

In case the state indicated by the input signal is wrong cutting data, the assigned program may for example cause the machine to change cutting data. Cutting data such as spindle speed, cutting depth or feed rate may for example be changed to values recommended for the currently employed tool and operating conditions.

According to some embodiments, the assigned program in the numerical control section may be an editable numerical control program (or NC program).

The numerical control program may for example be editable by an operator of the machine, such as via a user interface of the machine or via a personal computer connected to the machine.

In contrast to many PLC programs, the numerical control program may for example not be locked from editing by the machine manufacturer.

According to some embodiments, the method may further comprise evaluating the input signal in relation to a third condition. The method may further comprise assigning, in response to the input signal satisfying the third condition, at least a portion of a computer program in the programmable logic control section to be executed by the control system with the information as input.

Executing (in response to the input signal satisfying the third condition) at least a portion of a computer program in the programmable logic control section with the information as input allows this program to provide a response to the state of the tool or of the subtractive process. The program in the programmable logic control section may for example have been provided by a machine manufacturer to provide responses to certain states or events, which responses may preferably not be edited by an operator of the machine. These responses provided by the program in the programmable logic control section may for example be critical for safe operation of the machine, and editing of these responses may therefore be prevented by placing control of these responses in the programmable logic control section rather than in an editable program in the numerical control section. In this way, safe operation of the machine is maintained while operation of the machine may still be customized by an operator of the machine via programs in the numerical control section.

The evaluation of the input signal in relation to the third condition may for example be performed as an explicit third evaluation step in addition to the evaluation in relation to the first condition and the evaluation in relation to the second condition. Alternatively, the evaluation in relation to the third condition may be implicit. The input signal may for example automatically satisfy the third condition in case it does not satisfy any of the first and second conditions.

In response to the input signal satisfying the third condition, the at least a portion of a computer program in the programmable logic control section may for example be assigned to be executed by the programmable logic control section with the information as input.

The at least a portion of a computer program in the programmable logic control section may for example include instructions for controlling the machine to discontinue a motion and/or for replacing the tool by a sister tool.

According to some embodiments, the method may comprise, in response to the input signal satisfying the third condition: generating an intermediate signal by transforming at least part of the input signal, and assigning the at least a portion of a computer program in the programmable logic control section to be executed by the control system with the intermediate signal as input.

Computer programs in different programmable logic control sections may be adapted to receive data in different data formats. Transforming at least part of the received input signal before providing it as input to (at least a portion of) a computer program in the programmable logic control section allows the received input signal to be received in the same data format as signals provided as input to other programmable logic control sections. Use of a common data format for signaling to different programmable logic control sections facilitates communication between programmable logic control sections and other devices, such as systems configured to monitor operation of machines and to provide information about states of the machines to the programmable logic control sections.

According to some embodiments, the at least part of the input signal may include bits jointly signaling the state of the tool or the state of a subtractive process performed via interaction of the tool and the work piece. The intermediate signal may include a plurality of bits independently signaling whether the state of the tool or the state of the subtractive process performed via interaction of the tool and the work piece coincides with respective predefined states.

Many computer programs currently employed in programmable logic control sections such as PLCs are adapted to receive input in the form of bits (or flags) independently signaling whether a current state coincides with respective predefined states. For example, the value "1" for a bit (or flag) may indicate that the current state coincides with the predefined state associated with that bit, and "0" may indicate that the current state does not coincide with the predefined state associated with that bit. While this data format may be transparent and simple to implement, it requires a relatively large number of bits (one bit for each predefined state). A data format with bits jointly signaling a state is more bit-efficient. For example, joint signaling allows four bits to signal 16 different states instead of only 4 different states. Use of such a joint signaling format for transmitting the input signal to the control system therefore increases the speed by which states may be signaled to the control system. This allows the control system to more quickly respond to a state of the tool or of the subtractive process.

According to some embodiments, the assigned program in the programmable logic control section may be locked from editing.

An operator of the machine may for example be prevented from editing the assigned program in the programmable logic control section, while a service technician from the machine manufacturer may employ a password, a key, or a dedicated data port for circumventing or disabling the lock. In this way, programs that are too important (e.g. safety-critical programs) to be edited by an end user are kept safe from tampering, while editing is still possible for authorized personnel.

The assigned program in the programmable logic control section may for example be password-protected.

The assigned program in the programmable logic control section may for example only be edited via a dedicated data port.

According to some embodiments, the input signal may be received via an industrial network such as a field bus. A field bus may provide quick data transfers, allowing the control section to respond quickly to a state indicated by the input signal.

According to a second aspect, there is provided a computer program including instructions for performing the method according to any embodiment of the first aspect. The computer program may for example include instructions for causing a computer to perform the method according to any embodiment of the first aspect.

The advantages presented above for features of methods, according to the first aspect, may generally be valid for the corresponding features of computer programs according to the second aspect.

It will be appreciated that a computer program may for example include multiple subprograms and that storage of a computer program may for example be distributed over multiple memory devices, discs, servers, and/or hard drives.

According to a third aspect, there is provided a computer program package comprising the computer program according to any embodiment of the second aspect, and a complementary computer program for use in a monitoring system. The monitoring system comprises an input section for receiving data from at least the control system or the tool, and an output section for providing data to the control system. The complementary computer program includes instructions for performing a complementary method comprising obtaining an estimated state by estimating, based on data received by the input section, a state of the tool or a state of a subtractive process performed via interaction of the tool and the work piece. The complementary method comprises providing information about the estimated state to the output section for transmittal (or transmission), via the input signal, to the control system.

The advantages presented above for features of methods, according to the first aspect, may generally be valid for the corresponding features of computer program packages according to the third aspect.

It will be appreciated that the input section may for example receive data from both the control system and the tool.

In addition to estimating a state of the tool or a state of the subtractive process performed via interaction of the tool and the work piece, the monitoring system may for example estimate overall equipment effectiveness (OEE) for the machine. The monitoring system may for example estimate up time and down time of the machine.

Different parts (or portions) of the computer program package may for example be stored at separate locations, such as in different storage devices or memories. The computer program and the complementary computer program may for example be stored at separate locations, such as in different storage devices or memories.

The output section of the monitoring system may for example include a field bus interface.

According to a fourth aspect, there is provided computer-readable storage means storing the computer program according to any embodiment of the second aspect, or storing the computer program package according to any embodiment of the third aspect.

The advantages presented above for features of methods, according to the first aspect, may generally be valid for the corresponding features of computer-readable storage means according to the fourth aspect.

The computer-readable storage means may for example be a computer-readable medium. The computer-readable storage means may for example be a non-transitory computer-readable medium.

Computer-readable storage means according to the forth aspect may for example be regarded as part of a computer program product comprising computer-readable means (or a computer-readable medium) with instructions for performing the method according to any embodiment of the first aspect.

The computer-readable storage means may for example be provided in a single memory device, disc, server, or hard drive.

The computer-readable storage means may for example include a plurality of parts (or portions) distributed at separate locations. The parts of the computer-readable storage means may for example store respective portions of the computer program package (or of the computer program and the complementary computer program).

The computer-readable storage means may for example include a plurality of parts (or portions) distributed in different memory devices, discs, servers, and/or hard drives.

According to a fifth aspect, there is provided a control system. The control system comprises a programmable logic control section configured to control operation of a machine, and a numerical control section configured to control relative motion between a tool of the machine and a work piece. The programmable logic control section is configured to receive an input signal including information about a state of the tool or a state of a subtractive process performed via interaction of the tool and the work piece. The programmable logic control section is configured to evaluate the input signal in relation to a first condition and, in response to the input signal satisfying the first condition, provide the information to the numerical control section.

The programmable logic control section of the control system according to the fifth aspect may for example be adapted to perform any of the methods according to the first aspect.

The advantages presented above for features of methods, according to the first aspect, may generally be valid for the corresponding features of control systems according to the fifth aspect.

According to a sixth aspect, there is provided a system (or a combined system). The system (or combined system) comprises the control system according to any embodiment of the fifth aspect, and a monitoring system. The monitoring system is configured to receive data from at least the control system or the tool. The monitoring system is configured to obtain an estimated state by estimating, based on the received data, a state of the tool or a state of a subtractive process performed via interaction of the tool and the work piece. The monitoring system is configured to generate the input signal based on the estimated state, and to provide the input signal to the control system.

The advantages presented above for features of methods, according to the first aspect, may generally be valid for the corresponding features of systems according to the sixth aspect.

It will be appreciated that the monitoring system may for example receive data from both the control system and the tool.

In addition to estimating a state of the tool or a state of the subtractive process performed via interaction of the tool and the work piece, the monitoring system may for example estimate overall equipment effectiveness (OEE) for the machine. The monitoring system may for example estimate up time and down time of the machine.

The monitoring system may for example comprise a field bus interface for providing the input signal to the control system.

BRIEF DESCRIPTION OF THE DRAWINGS

In what follows, example embodiments will be described in greater detail and with reference to the accompanying drawings, on which.

All the figures are schematic and generally only show parts which are necessary in order to elucidate the respective embodiments, whereas other parts may be omitted or merely suggested.

DETAILED DESCRIPTION

Figure 1:
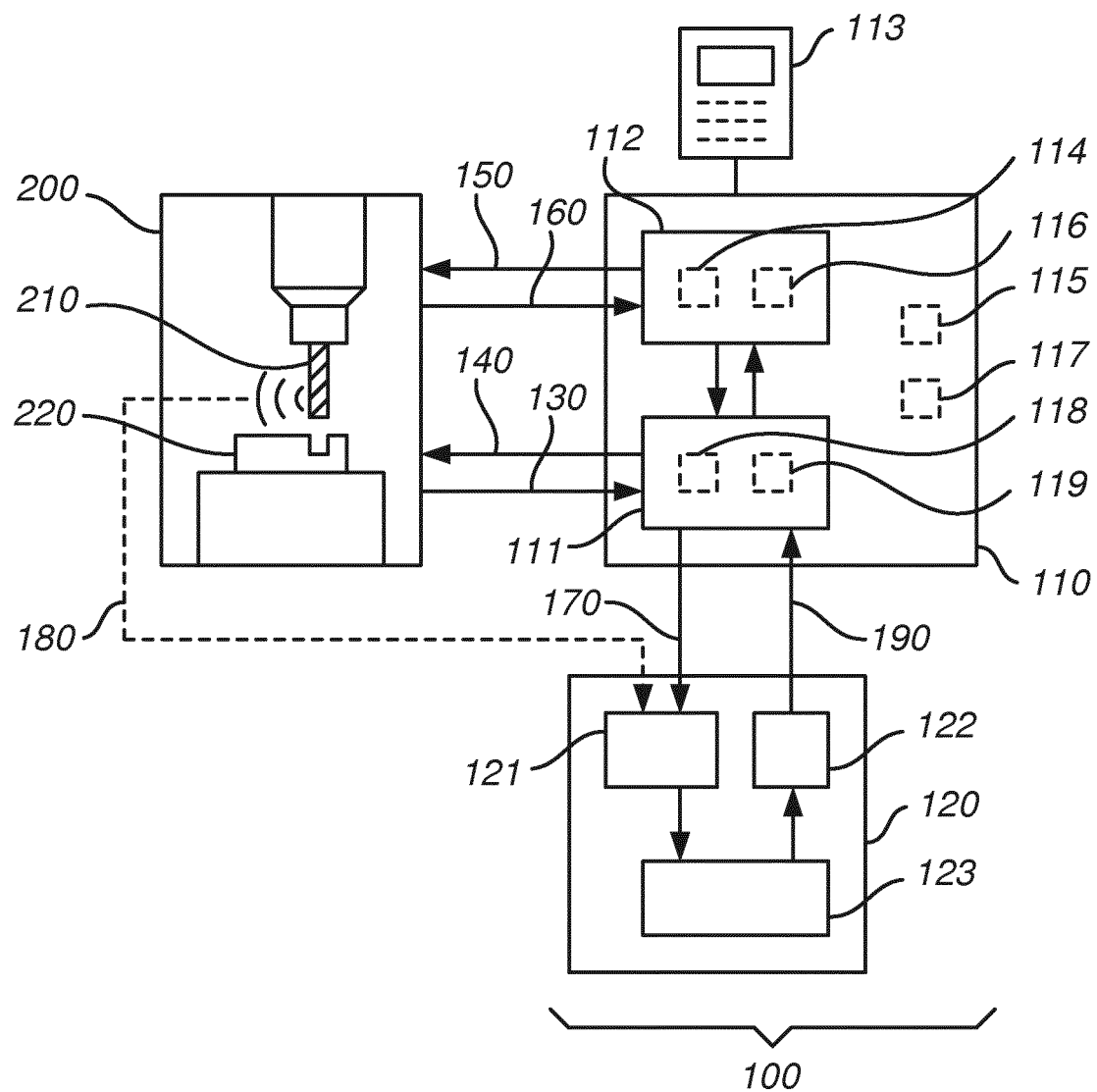
FIG. 1 is a generalized block diagram of a system for monitoring and controlling a machine, according to an embodiment.

FIG. 1 is a generalized block diagram of a system 100 for monitoring and controlling a machine 200, according to an embodiment.

The machine 200 comprises a tool 210 arranged to interact with a work piece 220 mounted in the machine 200. The tool 210 may for example be arranged for subtractive manufacturing, such as cutting, turning, drilling, milling, reaming, threading or grinding. The tool 210 may for example be arranged for performing subtractive manufacturing via interaction with a work piece 220 comprising metal, wood, polymer material or composite material. The tool 210 may for example be arranged for metal cutting.

The system 100 comprises a control system 110 and a monitoring system 120. The control system 110 comprises a programmable logic control section 111 and a numerical control section 112.

The programmable logic control section 111 is configured to control operation of the machine 200. The programmable logic control section 111 may receive one or more input signals 130 from the machine 200. The input signals 130 received from the machine 200 may be digital and/or analog input signals and may for example include information about levels, pressures, temperatures, and/or positions. The programmable logic control section 111 may send one or more control signals 140 to the machine 200, such as analog and/or digital signals for controlling the machine 200 to perform operations such as start, stop, fill, empty, and/or change.

The numerical control section 112 is configured to control relative motion between the tool 210 and the work piece 220 via control signals 150. The numerical control section 112 may for example control motion of the tool 210 and/or the work piece 220 by sending the control signals 150 to one or more servos and motors and/or servomotors (not shown in FIG. 1). The motion controlled by the numerical control section 112 may include translations along one or more axes and/or rotations around one or more axes. The numerical control section 112 may for example control spindle speed, cutting depth and/or feed rate of the tool 210.

The numerical control section 112 may for example receive feedback signals 160 from the machine 200 so that the numerical control section 112 may be aware of actual axis positions of the tool 210 and/or the work piece 220 at all times. In some embodiments, the numerical control section 112 may rely on feedback from the machine 200 via the programmable logic control section 111 and may for example not receive any feedback signals 160 directly from the machine 200.

The control system 110 may for example be mounted at the machine 200, or may be arranged separately from the machine 200. The control system 110 may for example be connected to the machine 200 via one or more wires or cables, or via a wireless connection.

The control system 110 may for example include a user interface 113 through which an operator of the machine 200 may monitor operation of the machine 200 and/or control operation of the machine 200. The user interface 113 may for example be mounted at the control system 110, or may be arranged separately from the control system 110. The user interface 113 may for example be connected to the control system 110 via one or more wires or cables, or via a wireless connection.

The user interface 113 may for example allow an operator of the machine 200 to edit or add numerical control programs to be executed by the numerical control section 112. The numerical control programs may for example be written in a programming language such as G-code.

Numerical control programs to be executed by the numerical control section 112 may for example be stored in a memory 114 arranged in the numerical control section 112, or in a shared memory 115 of the control system 110. Embodiments may also be envisaged in which an external memory (not shown in FIG. 1), connected to the control system 110, is employed for storing numerical control programs.

The numerical control section 112 may for example comprise a processor 116 for executing numerical control programs. In some embodiments, the numerical control section 112 may execute numerical control programs in a shared processor 117 of the control system 110.

The numerical control section 112 may for example be a numerical control kernel (NCK).

The programmable logic control section 111 may for example be a programmable logic controller (PLC) or a programmable logic relay (PRL).

The programmable logic control section 111 may for example be arranged for executing computer programs written in one or more of the standard IEC 61131-3 programming languages. The programmable logic control section 111 may for example be arranged for executing computer programs written in a ladder logic programming language or an instruction list programming language.

The programmable logic control section 111 may for example comprise a memory 118 for storing one or more computer programs to be executed by the programmable logic control section 111. In some embodiments, computer programs to be executed by the programmable logic control section 111 may be stored in a shared memory 115 of the control system 110. Embodiments may also be envisaged in which an external memory (not shown in FIG. 1), connected to the control system 110, is employed for storing computer programs to be executed by the programmable logic control section 111.

The programmable logic control section 111 may for example comprise a processor 119 for executing computer programs. In some embodiments, the programmable logic control section 111 may execute computer programs in a shared processor 117 of the control system 110.

In contrast to numerical control programs in the numerical control section 112, editing of computer programs in the programmable logic control section 111 by an operator of the machine 200 may be prevented. For example, editing of programs in the programmable logic control section 111 may require a password or key, or may only be performed via a dedicated input port of the control system 110. The machine manufacturer may for example have provided programs in the programmable logic control section 111 which may only be edited by an authorized service technician, while programs in the numerical control section 112 may be edited by the operator of the machine.

Operation of the programmable logic control section 111 will be further described below with reference to FIG. 2.

The monitoring system 120 comprises an input section 121, an output section 122 and a processing section 123. The input section 121 is configured to receive data 170 from the control system 110 and/or data 180 from the tool 210. The output section 122 is configured provide output 190 that is provided as an input signal 190 to the programmable logic control section 111 of the control system 110.

The tool 210 may for example comprise a wireless transmitter (not shown in FIG. 1) arranged to transmit the data 180 to the input section 121 of the monitoring system 120.

The control system 110 and the monitoring system 120 may for example be physically distinguishable devices or may be implemented as different software applications within a single device. The control system 110 and the monitoring system 120 may for example be connected to each other via an application programming interface (API).

The monitoring system 120 may for example be implemented as software in a personal computer or in an operator panel such as a user interface 113 of the control system, 110. Operation of the monitoring system 120 will now be described with reference to FIG. 4.

Figure 4:
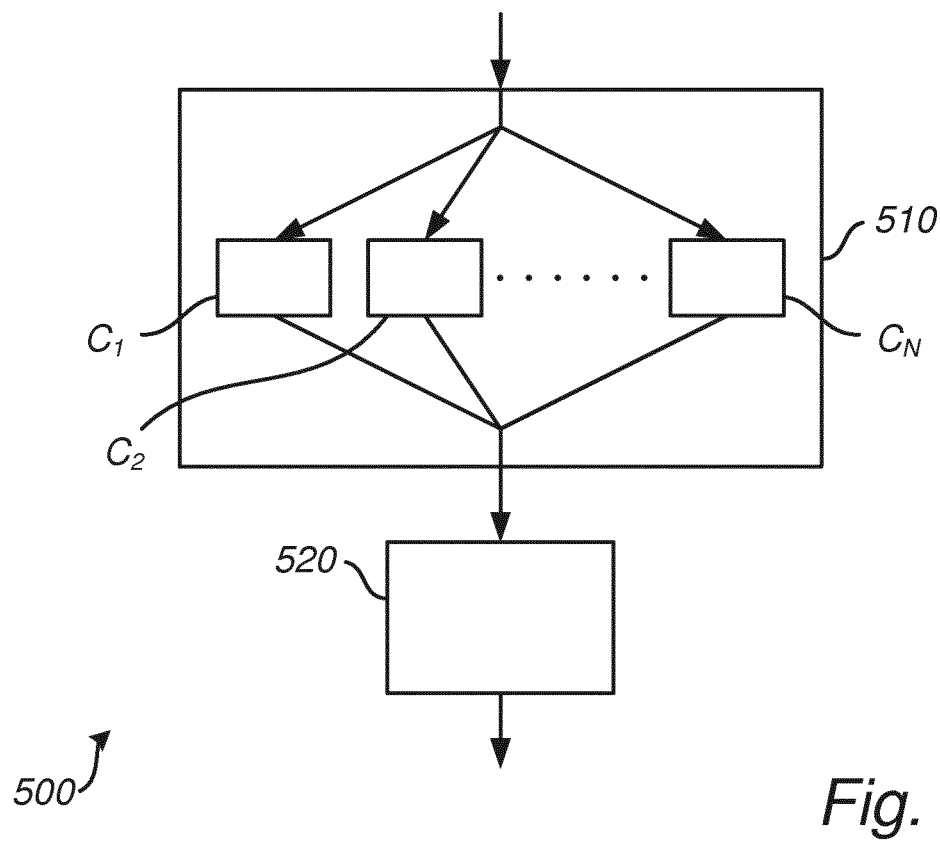
FIG. 4 is a flow chart of a complementary method performed in a monitoring system of the system shown in FIG. 1.

FIG. 4 is a flow chart of an example method 500 performed in the monitoring system 120. The method 500 may be regarded as a complementary method as it complements a method performed in the control system 110.

The complementary method 500 comprises obtaining, in step 510, as further described herein, an estimated state by estimating, based on data received by the input section 121, a state of the tool 210 or a state of a subtractive process performed via interaction of the tool 210 and the work piece 220.

Referring again to FIG. 1, data received by the input section 121 may be data 170 from the control system 110, data 180 from the tool 210 or a combination of these two types of data. Embodiments may also be envisaged in which the data received by the input section 121 may include data from other sources, such as from sensors arranged separately from the machine 200 and which are arranged to monitor the machine 200, the tool 210 and/or the work piece 220.

Data 170 received from the control system 110 may for example include at least some of the signals 130 and/or 160 received by the control system 110 from the machine 200, or may be based on the signals 130 and/or 160 received by the control system 110 from the machine 200.

The control system 110 may for example process (or analyze) signals 130 and/or 160 received from the machine 200 so as to determine or estimate what is happening within the machine 200. The control system 110 may for example estimate a state or condition of the machine 200, the tool 210 and/or the work piece 220. Data 170 received by the monitoring system 120 from the control system 110 may for example include such a state estimated by the control system 110.

Data 180 received by the monitoring system 120 from the tool 210 may be data from one or more sensors (not shown in FIG. 1) arranged in the tool 210. The data 180 received from the tool 210 may for example include an identity or type of the tool 210, or a temperature or force to which the tool 210 (or a cutting edge of the tool 210) is subjected during operation of the machine 200.

The processing section 123 of the monitoring system 120 processes (or analyzes) the data received by the input section 121 so as to estimate a state of the tool 210 or a state of a subtractive process performed via interaction of the tool 210 and the work piece 220.

A state of the tool 210 may for example be a temperature or force to which the tool 210 is subjected, or a vibration of the tool 210. A state of the tool 210 may for example be that a temperature, force or vibration of the tool 210 exceeds a threshold or is within a specific range. A state of the tool 210 may for example be tool 210 breakage, tool 210 wear or tool 210 missing.

A state of the subtractive process performed via interaction of the tool 210 and the work piece 220 may for example include cutting data such as current spindle speed, cutting depth and/or feed rate, or may include other parameters related to the interaction between the tool 210 and the work piece 220, such as shape and/or thickness of chips removed from the work piece 210 during the subtractive process.

A state of the subtractive process may for example be wrong cutting data. Wrong cutting data may indicate that currently employed cutting data such as spindle speed, cutting depth and/or feed rate is unsuitable for the tool 210. The currently employed cutting data may for example not comply with recommended cutting data specified by a tool 210 manufacturer.

A state of the subtractive process may for example relate to process chatter, i.e. machining vibrations of the tool 210 and/or work piece 220.

A state of the subtractive process may for example be that the work piece is missing and that there is in fact no interaction between the tool 210 and the work piece 220.

A state of the subtractive process may for example relate to the result of the interaction of the tool 210 and the work piece 220, such as the current geometry or surface finish of the work piece 220. The state of the subtractive process may for example be that a current geometry of the work piece 220 is within a tolerance (i.e. that the achieved geometry of the work piece 220 is acceptable), and that the subtractive process may therefore be discontinued.

The monitoring system 120 may for example have access to data not available to the control system 110, such as data 180 received from the tool 210, or recommended cutting data from the manufacturer of the tool 210, and may therefore be able to make a more accurate estimation of a state of the tool 210 or of the subtractive process.

The monitoring system 120 may for example comprise (or have access to) more powerful computing resources than the control system 110 and may therefore be able to make a more accurate estimation of a state of the tool 210 or of the subtractive process.

It will be appreciated that the processing section 123 may for example be a single processing unit or may comprise multiple processing resources distributed at separate locations. In other words, the step of obtaining 510 an estimated state may be performed more or less anywhere, via use of any type of processing means, such as via cloud computing.

The step of obtaining 510 an estimated state may for example include evaluating the received data 170 and/or 180 in relation a plurality of conditions $C_1$-$C_N$ indicative of respective states of the tool 210 and/or of the subtractive process.

The complementary method 500, performed in the monitoring system 120, further comprises providing 520 information about the estimated state to the output section 122 for transmittal via the input signal 190, to the programmable logic control section 111 in the control system 110.

Figure 2:
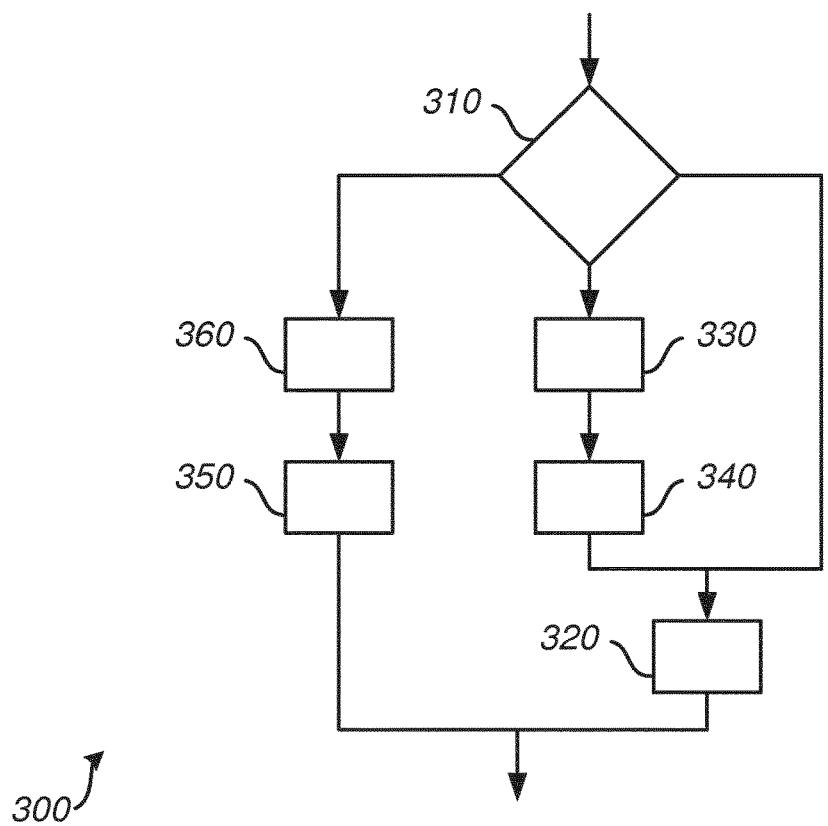
FIG. 2 is a flow chart of a method performed in a control system of the system shown in FIG. 1, according to an embodiment.

FIG. 2 is a flow chart of a method 300 performed in the control system 110, according to an embodiment. The method 300 may for example be performed in (or by) the programmable logic control section 111 of the control system 110.

The method 300 comprises evaluating, at step 310, an input signal 190, received by the programmable logic control section 111 (e.g. a programmable logic controller, PLC), in relation to one or more conditions. As described above with reference to FIG. 4, the input signal 190 includes information about a state of the tool 210 or about a state of a subtractive process performed via interaction of the tool 210 and the work piece 220.

If the input signal 190 satisfies a first condition, the method 300 may proceed to step 320 by providing the information to the numerical control section 112 (e.g. a numerical controller, NC, or numerical control kernel NCK).

The input signal 190 may for example be a digital signal comprising a number of bits together indicating a state of the tool 210 or of the subtractive process. The first condition may for example correspond to the bits representing a number larger or smaller than a threshold, or the bits representing a number within a certain interval.

The entire input signal 190 may for example be forwarded to the numerical control section 112. Alternatively, only a portion of the input signal 190 including the information about the state may be forwarded to the numerical control section 112. In some embodiments, a portion of the input signal 190 is provided only for the evaluation, at step 310, and may therefore be disregarded (or discarded) once the evaluation at step 310 has been performed.

The information may for example be provided, in step 320, to the numerical control section 112 in the same format as it was received in the input signal 190. Alternatively, the information may be transformed into a different format before being provided to the numerical control section 112.

The information may for example be provided, in step 320, to the numerical control section 112 by assigning values for one or more internal variables of the numerical control section 112.

The following scenario exemplifies how the ability to provide/forward, in step 320, information to the numerical control section 112 may be employed. When writing a numerical control program, the programmer or operator of the machine 200 may not know the optimal spindle speed. To provide optimal spindle speed in the machine, the spindle speed may have to be adjusted based on conditions not known to the operator when writing the NC program. The following syntax may for example be used:

```
N10 M6 T10 D1
N20 M3 S2000 F500
N30 G04 F0.2
N40 M3 S=2000+(VARIABLE2) F500
```

The programmer or operator may assume that the optimal spindle speed is 2000 rpm ("S2000") for the coming operation. In case the monitoring system 120 discovers that a different spindle speed may be better, the monitoring system 120 may signal the state "wrong cutting data" or "too low spindle speed" to the control system 110 via the input signal 190, and may also indicate via the input signal 190 how the spindle speed is to be adjusted. The monitoring system 120 may cause a change of the spindle speed via the input signal 190 since information included in the input signal 190 may be provided 320 by the programmable logic control section 111 to the numerical control section 112 by assigning the variable "VARIABLE2" employed in the numerical control program. The spindle speed may therefore be adjusted accordingly ("S=2000+(VARIABLE2)").

The above described numerical control program may be edited or tailored by the operator of the machine 200, in contrast to programs in a PLC which the operator may not be able to modify.

If the input signal 190 satisfies a second condition, the step 320 of providing the information to the numerical control section 112 is preceded by the steps of triggering, at 330, interruption of a computer program executed by the numerical control section 112, and assigning, at step 340, a computer program in the numerical control section 112 to be executed by the control system 110. If the input signal 190 satisfies the second condition, the information may be provided, at step 320, as input to the assigned computer program in the numerical control section 112.

The input signal 190 may for example be a digital signal comprising a number of bits. The second condition may for example correspond to the bits representing a number larger or smaller than a threshold, or the bits representing a number within a certain interval.

The following scenario exemplifies how the ability to trigger, at step 330, interruption of a computer program executed by the numerical control section 112 may be employed. In case the spindle speed needs to be adapted based on factors not known by the programmer or operator when making/writing a first numerical control program, the spindle speed may be adjusted during operation of the machine 200 by interrupting the first numerical control program and starting a second numerical control program which changes the spindle speed, and by then jumping back to the first numerical control program for continuing operation of the machine 200 with the new spindle speed. The following syntax may for example be used in the first numerical control program:

```
N10 M6 T10 D1
N20 M3 S2000 F500
```

The monitoring system 120 may detect/determine that a different spindle speed is optimal and may signal "wrong spindle speed" via the input signal 190. This may cause triggering, at step 330, of an interruption of the first numerical control program and assigning, at step 340, of the second numerical control program (containing executable actions) to be executed together with information stored in a first variable ("VARIABLE1") for finding the right action type and a second variable ("VARIABLE2") containing the optimal spindle speed determined by the monitoring system 120. In other words, information included in the input signal 190 may be provided, at step 320, to the numerical control section 112 via these two variables. The second numerical control program may for example include executable action types according to the following syntax:

```
IF VARIABLE1 == 1 GOTOF N10
GOTOF N30
N10 M3 S=VARIABLE2
GOTOF N20
N20
REPOSA
M17
N30
RET
```

The second numerical control program may be edited or tailored by the operator of the machine 200, in contrast to programs in a PLC which the operator may not be able to modify. As an interrupt is triggered in this scenario, it is possible to provide a quicker response to the state signaled by the input signal 190 than in the first scenario where interrupt is not triggered.

The second numerical control program is an example of the computer program 400, described below with reference to FIG. 3.

If the input signal 190 satisfies a third condition (the third condition may for example correspond to neither of the first and second conditions being satisfied), the method 300 may not proceed by providing, at step 320, the information to the numerical control section 112. Instead, the method 300 may proceed by the step of assigning, at step 350, a portion of a computer program in the programmable logic control section 111 to be executed by the control system 110 with the information as input.

For example, if the spindle speed needs to be adjusted, as in the scenarios described above, this may be signaled by the monitoring system 120 via the input signal 190, and the programmable logic control section 111 may decide (based on evaluation of the input signal 190 in relation to the third condition) to set a new spindle speed itself, instead of forwarding information from the input signal 190 to the numerical control section 112 for adjusting the spindle speed.

A computer program may for example have been included in the programmable logic control section 111 by the machine manufacturer for providing adjustment of the spindle speed.

Adjustment of the spindle speed may for example be provided by the programmable logic control section 111 in case no customized numerical control programs have been provided by the operator of the machine 200 for providing adjustment of spindle feed, or in case adjustment of the spindle speed (for at least some particular state of the machine 200) is considered too important (or safety-critical) to be customized by an operator of the machine 200.

The information provided as input to the assigned computer program in the programmable logic control section 111 may be transformed before being provided as input to the assigned computer program. For example, if the input signal 190 satisfies the third condition, the method 300 may proceed by generating, at step 360, an intermediate signal by transforming the input signal 190, and then assigning, at step 350, the portion of a computer program in the programmable logic control section 111 to be executed by the control system 110 with the intermediate signal as input.

The input signal 190 may for example be a digital signal comprising a number of bits together representing a number which corresponds to a state of the tool 210 or of the subtractive process performed via interaction of the tool 210 and the work piece 220. In other words, a joint signaling format may be employed in which the bits together indicate a state.

The intermediate signal, obtained by transforming, at step 360, the input signal 190, may include a plurality of bits independently signaling whether the state of the tool 210 or of the subtractive process coincides with respective predefined states. In other words, the bits may be associated with respective predefined states and each individual bit may act as a flag indicating whether or not its associated predefined state has recently occurred in the machine 200.

While joint signaling is more bit-efficient, individual signaling of respective states via flags is common as input to programmable logic controllers (PLCs). Providing a transformation (or translation) between these two data formats allows for use of the more bit-efficient format for transmissions to a PLC and the more commonly used flag-based format as input to at least some PLC programs, or to at least some portions of a PLC program.

Quick responses to states indicated by the input signal 190 may be important for extending the lifetime of the tool 210, or to prevent a broken tool 210 from causing damage to the work piece 220 or to other parts of the machine 200. Bit-efficient transmission formats may shorten response times of the control system 110.

The input signal 190 may for example be received via a field bus, so as to provide quick data transfers and to reduce response times of the control system 110 to states indicated by the input signal 190.

Although a field bus may provide particularly quick data transfers, embodiments may also be envisaged in which the input signal 190 may be received via other means, such as via wired or wireless connections. The input signal 190 may for example be received via a TCP/IP connection.

In some embodiments, the monitoring system 120 and the control system 110 may be connected to each other via an application programming interface (API). The input signal 190 may for example be provided from the monitoring system 120 to the control system 110 using the API.

The control system 110 may for example provide an acknowledgement once the input signal 190 has been received. The control system 110 (or the programmable logic control section 111) may for example send back the input signal 190 to the monitoring system 120 to acknowledge receipt of the input signal 190.

Figure 3:
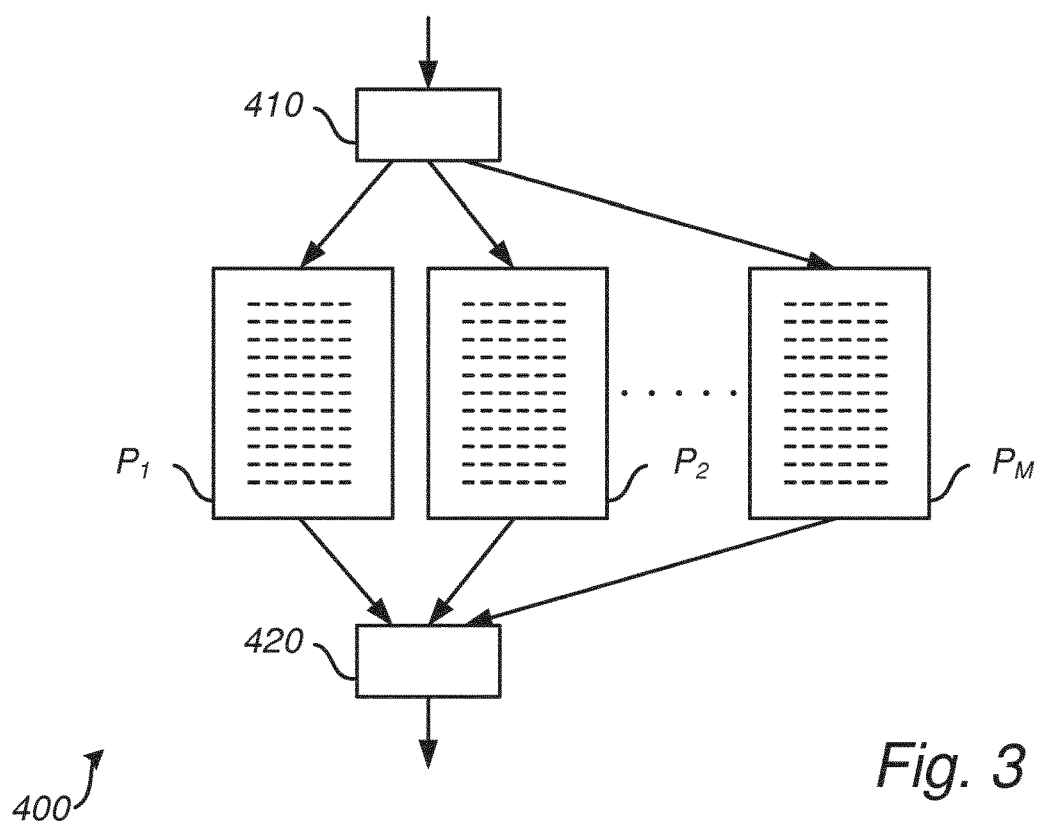
FIG. 3 is an overview of an example computer program in a numerical control section of the system shown in FIG. 1.

FIG. 3 is an overview of an example computer program 400 in the numerical control section 112 of the system 100 described with reference to FIG. 1. In steps of the method 300, described with reference to FIG. 2, the computer program 400 may be assigned, at step 340, to be executed by the control system 110 (or by the numerical control section 112) and the input signal 190 (or parts thereof) may be provided, at step 320, as input to the computer program 400. For example, internal variables of the numerical control section 112 may be assigned values based on the input signal 190, and these internal variables may then be employed as input by the computer program 400.

The computer program 400 includes instruction for selecting 410, based on the input signal 190 (or based on variables in the numerical control section 112 assigned based on the input signal 190), an appropriate subprogram $P_1$-$P_M$ to be executed. As described above with reference to FIGS. 1 and 2, the input signal 190 includes information about a state of the tool 210 or of the subtractive process performed via interaction of the tool 210 and the work piece 220. The subprograms $P_1$-$P_M$ include instructions for responding to different states. Depending on the state indicated by the input signal 190, one or more of the subprograms $P_1$-$P_M$ is therefore selected to provide an appropriate response to the indicated state. The response may be provided via control signals 150 from the numerical control section 112 to the machine 200.

The program 400 may for example comprise a plurality of lines/rows including respective executable commands or instructions. The subprograms P1-PM may for example start at respective lines or positions in the computer program 400. The step of selecting, at 410, an appropriate subprogram P1-PM may for example include jumping to a line or position in the program 400 at which the appropriate subprogram P1-PM starts.

The program 400 may for example include respective subprograms $P_1$-$P_M$ for providing responses to states such as tool breakage, tool wear, tool missing, work piece missing, and wrong cutting data.

Wrong cutting data may indicate that currently employed cutting data such as spindle speed, cutting depth and/or feed rate is unsuitable for the tool 210. The currently employed cutting data may for example not comply with recommended cutting data specified by the tool manufacturer. The associated subprogram $P_1$-$P_M$ may therefore include instructions for modifying or adjusting cutting data such as spindle speed, cutting depth and/or feed rate.

Figure 5:
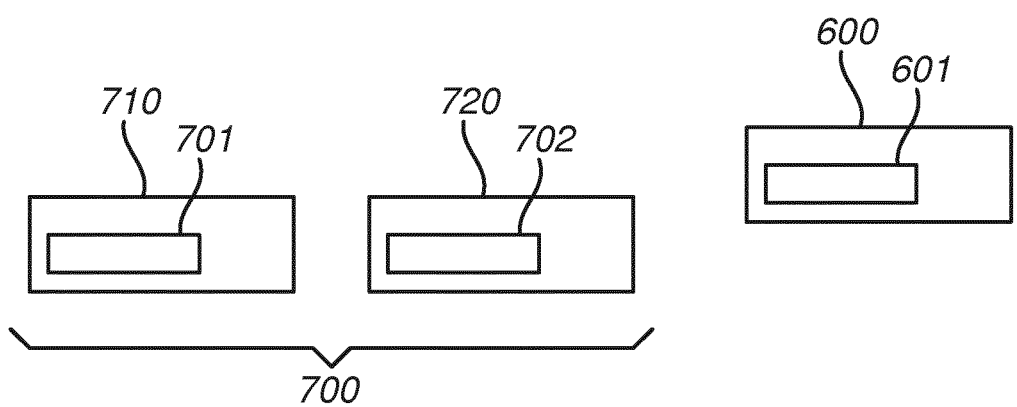
FIG. 5 shows computer-readable storage means storing a computer program including instructions for performing the method shown in FIG. 2, and computer-readable storage means storing a computer program package including instructions for performing the methods shown in FIGS. 2 and 4, according to embodiments.

FIG. 5 shows first computer-readable storage means 600 and second computer readable storage means 700, according to example embodiments.

The first computer-readable storage means 600 stores a computer program 601 including instructions for performing the method 300 described with reference to FIG. 2. The first computer-readable storage means (or computer-readable medium) 600 is exemplified herein by a single disc or memory storing the entire computer program 601 at a single physical location. The first computer-readable storage means 600 may for example be provided on a single server, hard-drive, memory stick, compact disc (CD) or digital versatile disc (DVD). Embodiments may also be envisaged in which the first computer-readable storage means 600 may comprise multiple portions arranged at separate physical locations and storing respective portions of the computer program 601. Different portions of the computer-readable storage means 600 may for example be provided on different servers, hard-drives, memory sticks, CDs or DVDs. The computer program 601 may for example be stored on one or more servers, and may be available for downloading over the Internet to the control system 110 described with reference to FIG. 1.

The second computer-readable storage means 700 stores a computer program package including instructions for performing the methods 300 and 500 described with reference to FIGS. 2 and 4. The second computer-readable storage means 700 comprises multiple portions 710 and 720 arranged at separate physical locations and storing respective portions 701 and 702 of the computer program package.

A first portion 710 of the second computer readable storage means 700 may for example store a computer-program 701 including instructions for performing the method 300 described with reference to FIG. 2. A second portion 720 of the second computer readable storage means 700 may for example store a computer program 702 including instructions for performing the complementary method 400 described with reference to FIG. 4. The portions 710 and 720 of the second computer-readable storage means 700 may for example be provided on different servers, hard-drives, memory sticks, CDs or DVDs. The computer programs 701 and 702 may for example be stored on different servers, and may be available for downloading over the Internet to the control system 110 and the monitoring system 120, described with reference to FIG. 1.

The person skilled in the art realizes that the present invention is by no means limited to the preferred embodiments described above. On the contrary, many modifications and variations are possible within the scope of the appended claims. Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The division of tasks between functional units referred to in the present disclosure does not necessarily correspond to the division into physical units; to the contrary, one physical component may have multiple functionalities, and one task may be carried out in a distributed fashion, by several physical components in cooperation. A computer program may be stored/distributed on a suitable medium, such as an optical storage medium or a solid-state medium supplied together with or as part of other hardware, but may also be distributed in other forms, such as via the Internet or other wired or wireless telecommunication systems. The mere fact that certain measures are recited in mutually different dependent claims does not indicate that a combination of these measures cannot be used to advantage. Any reference signs in the claims should not be construed as limiting the scope.

The invention claimed is:

1. A method, performed in a control system, wherein the control system includes a programmable logic control section configured to control operation of a machine and a numerical control section configured to control relative motion between a tool of said machine and a work piece, wherein the method comprises:
    evaluating an input signal, received by the programmable logic control section, in relation to a first condition, wherein the input signal includes information about a state of the tool or about a state of a subtractive process performed via interaction of the tool and the work piece;
    in response to the input signal satisfying the first condition, providing said information to the numerical control section as input to a current computer program being executed by the numerical control section without interrupting the current computer program;
    evaluating the input signal in relation to a second condition, which is different from the first condition;
    in response to the input signal satisfying the second condition;
    triggering interruption of the current computer program executed by the numerical control section;
    assigning another computer program in the numerical control section to be the executed by the control system;
    providing said information as input to the assigned computer program allowing the assigned computer program to distinguish between different states of the tool or the subtractive process;
    evaluating the input signal in relation to a third condition; and
    in response to the input signal satisfying the third condition, assigning at least a portion of a computer program in the programmable logic control section to be executed by the control system with said information as input.

2. The method of claim 1, wherein the information included in the input signal indicates:
    tool breakage;
    tool wear;
    tool missing;
    work piece missing;
    wrong cutting data;
    a temperature to which the tool is subjected;
    a force to which the tool is subjected;
    tool vibration;
    process chatter; or
    a current geometry of the work piece.

3. The method of claim 1, comprising, in response to the information included in the input signal, indicating a state from a set of predefined states:
  triggering interruption of a computer program including computer executable code executed by the numerical control section;
  assigning another computer program including computer executable code in the numerical control section to be the executed by the control system; and
  providing said information as input to the assigned computer program, wherein the set of predefined states includes:
  tool breakage;
  tool wear;
  tool missing;
  work piece missing;
  wrong cutting data;
  a temperature to which the tool is subjected exceeds a threshold;
  a force to which the tool is subjected exceeds a threshold;
  tool vibration exceeds at threshold;
  process chatter exceeds a threshold; or
  a current geometry of the work piece is within a tolerance.

4. The method of claim 3, wherein the assigned computer program in the numerical control section includes instructions for controlling the machine to:
  discontinue a motion;
  retract the tool from the work piece;
  retract the work piece from the tool;
  replace the tool by a sister tool;
  move the tool towards a camera for evaluation;
  move the work piece towards a camera for evaluation;
  trigger motion of a camera for evaluation of the tool;
  trigger motion of a camera for evaluation of the work piece; or
  change cutting data.

5. The method of claim 3, wherein the assigned computer program in the numerical control section is an editable numerical control program.

6. The method of claim 1, wherein the assigned computer program in the numerical control section includes instructions for controlling the machine to:
  discontinue a motion;
  retract the tool from the work piece;
  retract the work piece from the tool;
  replace the tool by a sister tool;
  move the tool towards a camera for evaluation;
  move the work piece towards a camera for evaluation;
  trigger motion of a camera for evaluation of the tool;
  trigger motion of a camera for evaluation of the work piece; or
  change cutting data.

7. The method of claim 1, wherein the assigned computer program in the numerical control section is an editable numerical control program.

8. The method of claim 1, comprising, in response to the input signal satisfying the third condition:
  generating an intermediate signal by transforming at least part of the input signal; and
  assigning said at least a portion of a computer program including computer executable code in the programmable logic control section to be executed by the control system with the intermediate signal as input.

9. The method of claim 8, wherein said at least part of the input signal includes bits jointly signaling said state of the tool or said state of a subtractive process performed via interaction of the tool and the work piece, and wherein the intermediate signal includes a plurality of bits independently signaling whether the state of the tool or the state of the subtractive process performed via interaction of the tool and the work piece coincides with respective predefined states.

10. The method of claim 1, wherein the assigned program in the programmable logic control section is locked from editing.

11. A computer program stored on a non-transitory computer readable storage medium including computer executable code for performing the method as defined in claim 1.

12. A computer program package stored on a non-transitory computer readable storage medium, the computer program package comprising:
  the computer program of claim 11; and
  a complementary computer program, for use in a monitoring system, wherein the monitoring system includes an input section for receiving data from at least the control system or the tool, and an output section for providing data to the control system, wherein the complementary computer program includes computer executable code for performing a complementary method comprising:
  obtaining an estimated state by estimating, based on data received by the input section, a state of the tool or a state of a subtractive process performed via interaction of the tool and the work piece; and
  providing information about the estimated state to the output section for transmittal, via said input signal, to the control system.

13. A non-transitory computer-readable storage means for storing the computer program and computer program package of claim 12.

14. A control system comprising:
  a programmable logic control section configured to control operation of a machine; and
  a numerical control section configured to control relative motion between a tool of said machine and a work piece,
  wherein the programmable logic control section is configured to:
  receive an input signal including information about a state of the tool or a state of a subtractive process performed via interaction of the tool and the work piece;
  evaluate the input signal in relation to a first condition;
  in response to the input signal satisfying the first condition, provide said information to the numerical control section as input to a current computer program being executed by the numerical control section without interrupting the current computer program;
  evaluating the input signal in relation to a second condition, which is different from the first condition;
  in response to the input signal satisfying the second condition;
  triggering interruption of the current computer program executed by the numerical control section;
  assigning another computer program in the numerical control section to be the executed by the control system;
  providing said information as input to the assigned computer program allowing the assigned computer program to distinguish between different states of the tool or the subtractive process;
  evaluating the input signal in relation to a third condition; and
  in response to the input signal satisfying the third condition, assigning at least a portion of a computer program in the programmable logic control section to be executed by the control system with said information as input.

15. A system comprising:

the control system of claim 14; and a monitoring system configured to:

receive data from at least the control system or the tool;

obtain an estimated state by estimating, based on the received data, a state of the tool or a state of a subtractive process performed via interaction of the tool and the work piece;

generate said input signal based on the estimated state; and provide said input signal to the control system.

* * * * *